United States Patent [19]
Redmon

[11] 3,947,745
[45] Mar. 30, 1976

[54] VARIABLE VOLTAGE INVERTER

[75] Inventor: James E. Redmon, Fremont, Nebr.

[73] Assignee: Agricultural Enterprises, Inc., Fremont, Nebr.

[22] Filed: Feb. 28, 1974

[21] Appl. No.: 446,659

[52] U.S. Cl. .................................................. 321/2
[51] Int. Cl.² ............................................. H02M 3/22
[58] Field of Search ................. 321/2; 331/111, 150

[56] References Cited
UNITED STATES PATENTS 3,225,309  12/1965  Phelps ............................ 331/150 X
3,828,239  8/1974  Nagai et al ............................ 321/2

Primary Examiner—R. N. Envall, Jr.
Attorney, Agent, or Firm—Henderson & Strom

[57] ABSTRACT

A relaxation oscillator having a programmable unijunction transistor for producing an A.C. voltage. A variable portion of the A.C. voltage is selected and operates connected transistor amplifiers, which in turn cause an amplified A.C. voltage to be induced in a transformer. A voltage multiplier further increases the voltage and produces an output D.C. signal.

5 Claims, 1 Drawing Figure

VARIABLE VOLTAGE INVERTER

BACKGROUND OF THE INVENTION

The present invention relates generally to voltage inverters, and more particularly to a highly portable variable voltage inverter.

One of the problems in designing an inverter of this type has been the one of achieving precision without undue complexity. Another problem has been the one of producing a highly portable device which will produce a larger voltage from a small electric source, for example when the device to be supplied with electricity is adapted to be moved from place to place and the source of electricity must accompany the device.

SUMMARY OF THE INVENTION

The circuit of the instant invention operates to take a low voltage, high current D.C. source signal and convert it to a large voltage, low current D.C. signal.

It is an object of the present invention to provide a variable voltage inverter which is very precise and yet economical to produce.

Another object of the invention is to provide a highly portable voltage inverter which can produce a high voltage from a low voltage source.

These objects and other features and advantages of this invention will become readily apparent by reference to the following drawing.

BRIEF DESCRIPTION OF THE DRAWINGS

The appended drawing illustrates the invention wherein the single FIGURE is a schematic representation of the circuit of this invention.

DESCRIPTION OF THE PREFERRED EMBODIMENT

Figure 1:
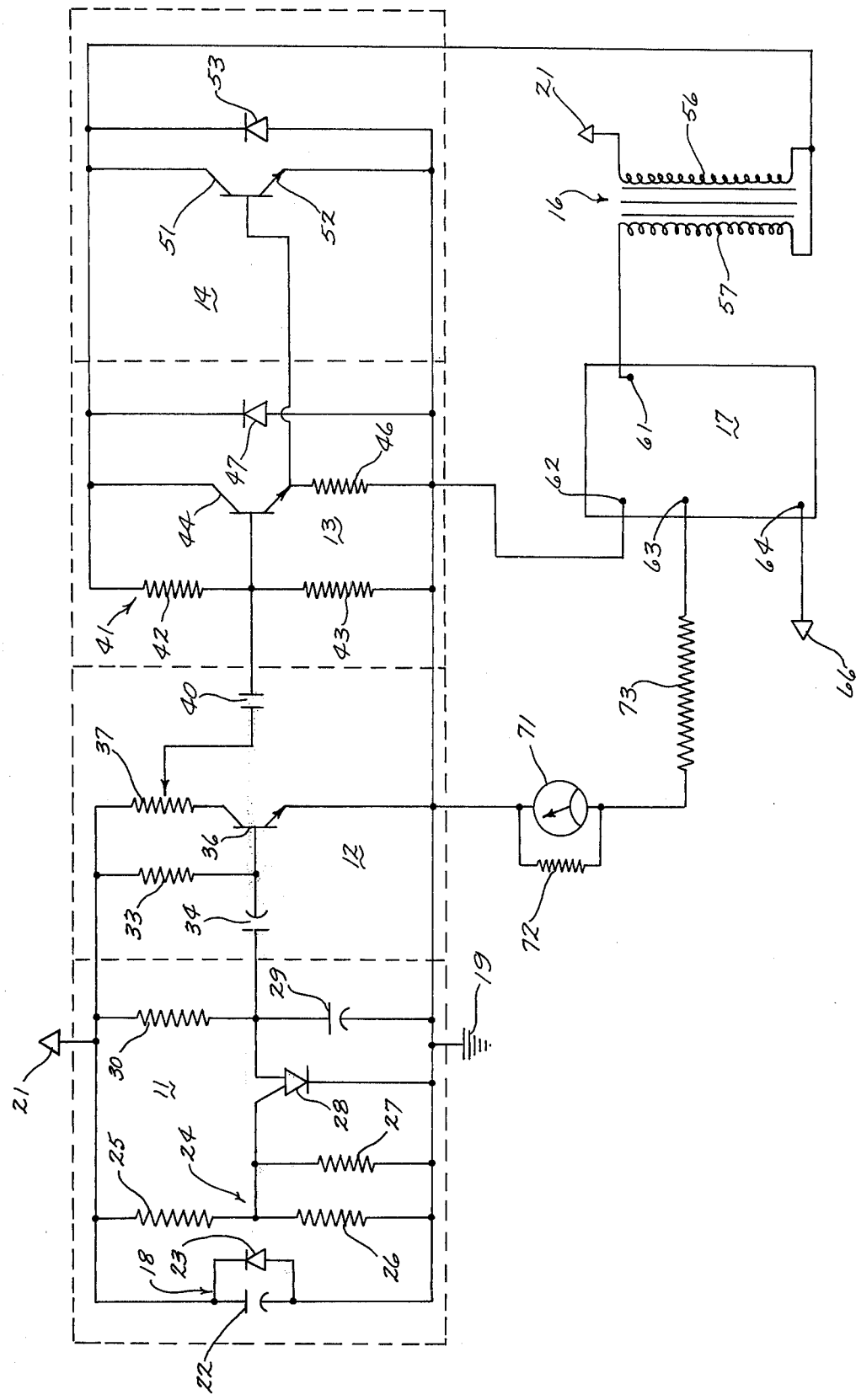

Referring now to the drawing, the circuit of this invention comprises generally a relaxation oscillator 11, transistor amplifiers 12, 13, 14, a transformer 16, and a voltage tripler 17.

More particularly, the relaxation oscillator 11 includes a source tap 21 for receiving the input voltage, and a constant voltage source 18 including a capacitor 22 connected between the tap 21 and ground 19 and a protection diode 23 connected across the capacitor 22. The oscillator 11 also includes a voltage divider network 24 comprising a resistor 25 and the parallel resistors 26, 27. The network 24 is connected to the anode gate of a programmable unijunction transistor 28 and biases the transistor 28. A capacitor 29 is connected across the transistor 28 and to the ground 19. A resistor 30 is connected between the input tap 21 and the capacitor 29. The resistor 33 and capacitor 34 provide an RC coupling of the oscillator 11 and the first transistor amplifier 12.

The amplifier 12 is a common emitter amplifier. The capacitor 34 is connected to the base of the npn transistor 36. A potentiometer 37 is connected to the collector of the transistor 36. A capacitor 40 couples the first amplifier 12 to the second transistor amplifier 13.

The capacitor 40 is connected to the base of the npn transistor 44 of the amplifier 13. The transistor 44 is biased by the voltage divider 41 comprising the resistors 42, 43. A resistor 46 is connected between the emitter of the transistor 44 and ground 19. A diode 47 is connected between the collector of the transistor 44 and ground 19.

The third transistor amplifier 14 includes a transistor 51, the emitter of which is connected to ground 19, and the base of which is connected to the emitter of the transistor 44, a modified darlington amplifier comprising amplifiers 13 and 14 being formed thereby. The transistor 51 is mounted on a heatsink (not shown), and a diode 53 is connected between the collector and emitter of the transistor 51.

The amplifier 14 is connected to a transformer 16 having primary and secondary coils 56, 57. The transformer 16 of the preferred embodiment is a D514 Delco Coil (which provides an output of 40,000 KV at 0.05 milliamps). An input tap 21 and the amplifier 14 are connected to the primary coil 56, and the secondary coil 57 is connected to a voltage tripler 17 at 61.

The tripler 17 of the preferred embodiment is a 76-14327-1 Philco Tripler. The tripler 17 is connected to ground 19 at 62, through a resistor 73 to a voltage meter 71 and resistor 72 at 63, and to the output top 66 at 64.

When in operation, a steady state D.C. signal is applied to the input tap 21. The capacitor 22 charges up to the applied voltage and then discharges when necessary to maintain a constant voltage between the tap 21 and ground 19 and into the oscillator 11. The capacitor 22 acts as a radio frequency filter, shorting out high frequency transients due to the switching of the programmable unijunction transistor 28. The diode 23 protects the capacitor 22 by providing a bypass for current going from ground 19 to input 21.

The capacitor 29 charges from the source tap 21 through the resistor 30. When the capacitor 29 charges to the voltage at which the programmable unijunction transistor 28 will fire or conduct (from the anode through the cathode), which voltage has been determined by the biasing network 24, the transistor 28 conducts causing the capacitor 29 to discharge and the oscillator 11 to pulse. An A.C. voltage, having a sawtooth waveform, is thereby input to the capacitor 34.

The capacitor 34 removes the D.C. component of the voltage waveform input so that the voltage applied to the base of transistor 36 is an A.C. voltage alternating about the biasing voltage for the base of the transistor 36. The alternating voltage causes a variation in the base current and therefore the collector current of the transistor 36, therefore causing a switching on and off of the transistor 36. An A.C. voltage, having a slightly modified squarewave form, is input to the potentiometer 37.

The potentiometer 37 is adjusted to pick up the portion of the A.C. voltage desired. For a D.C. voltage output of zero for the circuit, the potentiometer 37 is adjusted to pick up only the D.C. voltage from the tap 21. For the maximum D.C. voltage output of the circuit, the potentiometer 37 is adjusted to pick up the entire A.C. voltage output of the transistor 36.

The capacitor 40 transmits only the A.C. portion of the voltage waveform input to it. When the voltage applied to the base of the driving transistor 44 increases to a certain value, the transistor 44 switches on, switching on the transistor 51. As the voltage falls below that value the transistors 44, 51 switch off. As the transistor 51 switches on and off, the voltage at the bottom of the primary coil 56 switches between the voltage input at tap 21 and a voltage close to zero. A substantially greater A.C. voltage is induced in the secondary coil 57, which voltage is tripled by the voltage tripler 17 and output at tap 66 as a D.C. voltage.

It will be understood that the meter 71 and potentiometer 37 and thereby the inverter itself enables the operator to obtain an extremely precise variation of output voltages in a simple and easy manner.

Although a preferred embodiment has been disclosed herein, it is to be remembered that various modifications and alternate constructions can be made thereto without departing from the full scope of the invention, as defined in the appended claims.

I claim:

1. A variable voltage inverter comprising:
   a source of D.C. voltage;
   a relaxation oscillator means connected to said source for receiving and converting the D.C. voltage signal to a first A.C. voltage signal, said relaxation oscillator means including a programmable unijunction transistor;
   a first transistor amplifying means for receiving said first A.C. voltage signal and providing a second A.C. voltage signal, said first amplifying means having a resistor and a first capacitor forming an RC-coupling to said oscillator means, said first amplifying means including a potentiometer means for selecting and transmitting a variable portion of said second A.C. voltage signal, said first amplifying means having a second capacitor connected to said potentiometer means;
   a second transistor amplifying means connected by said second capacitor to said first amplifying means and actuated by said variable portion of said second A.C. voltage signal whereby said second amplifying means is switched alternately between conducting and non-conducting states;
   a transformer means connected to said second amplifying means; and
   a voltage multiplier means for producing a stepped-up D.C. voltage signal from an input A.C. signal, said multiplier means being coupled to said transformer means, whereby a variable D.C. voltage output is obtained.

2. A variable voltage inverter as defined in claim 1 wherein said voltage multiplier is a voltage tripler.

3. A variable voltage inverter as defined in claim 1 wherein said first amplification means includes a common-emitter transistor amplifier.

4. A variable voltage inverter as defined in claim 1 wherein said second amplification means includes first and second transistors, the emitter of said first transistor being connected to the base of said second transistor.

5. A variable voltage inverter as defined in claim 1 and further wherein said first A.C. voltage signal has a sawtooth waveform and said second A.C. voltage signal has a squarewave form.

* * * * *